United States Patent Office 2,927,126
Patented Mar. 1, 1960

2,927,126

PREPARATION OF N-(2-CYANOETHYL) AMIDE COMPOUNDS

Laurence A. Pursglove, Midland, Mich., assignor to The Dow Chemical Company, Midland, Mich., a corporation of Delaware No Drawing. Application October 16, 1957
Serial No. 690,442

14 Claims. (Cl. 260—465)

The present invention lies in the field of organic chemistry and is more particularly pertinent to the preparation of N-(2-cyanoethyl) amide compounds having the general formula:

R—(X)—NHCH$_2$CH$_2$CN wherein R is selected from the group consisting of saturated and unsaturated monovalent aliphatic hydrocarbon radicals, alkoxyalkyl radicals, aryloxyalkyl radicals, aryl radicals, haloaryl radicals, alkoxyaryl radicals and nitroaryl radicals and (X) is selected from the group consisting of the bivalent radicals —CO— and —SO$_2$—. The present application is a continuation-in-part of the copending application for United State Letters Patent having Serial No. 600,169 which was filed on July 26, 1956, and is now abandoned.

It is the object of the invention to provide a novel method for the preparation of compounds of the indicated variety, that, among other utile characteristics, have biochemical value as either fungicides, herbicides, insecticides, nemacides, or the like, depending upon their individual properties and capabilities.

According to the invention, such compounds may advantageously be provided by a method which comprises decyanoethylating, under the influence of a strong basic catalyst and while it is dissolved in a suitable non-aqueous solvent, and N,N-bis(2-cyanoethyl) amide compound having the general formula:

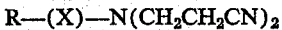

R—(X)—N(CH$_2$CH$_2$CN)$_2$ wherein both R and (X) are the same as described above. It is presumed, upon the basis of reasonable information and belief, that the reaction which occurs may be illustrated in the following manner:

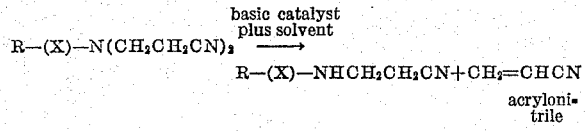

R—(X)—N(CH$_2$CH$_2$CN)$_2$ $\xrightarrow{\text{basic catalyst plus solvent}}$

R—(X)—NHCH$_2$CH$_2$CN + CH$_2$=CHCN acrylonitrile

While the method of the invention may be practiced under varying conditions, it is usually an advantage for it to be conducted under atmospheric pressure at or about at ebullitive temperatures while refluxing the solvent that may be evaporated during the course of the reaction. Ordinarily, the reaction may thus be accomplished within 2 to 3 hours and, in many instances, may be completed in shorter periods of time.

The particular selection that is made from the indicated group for the radical R is relatively immaterial insofar as the realization of good results in the practice of the invention is concerned. Advantageously, the independent hydrocarbon aryl and halogenated hydrocarbon aryl groups as well as the aryl units of mixed aryl-alkyl radicals that are employed are those that contain from 6 to 12 carbon atoms in their structure (including therein the carbon atoms that are present in substituent units attached to the cyclic nucleus), such as phenyl groups, tolyl groups, xylyl groups, naphthyl groups and the like. Similarly, it is generally an advantage for both the saturated and unsaturated monovalent hydrocarbon radicals and the alkyl groups which occur as units of the radicals comprised of both alkyl and aryl groups to be those that contain from 1 to about 20 carbon atoms in their structure, including such various alkyl and other aliphatic hydrocarbon groups as methyl, ethyl, butyl, etc., stearyl, lauryl, oleyl, ricinoleyl, linoleyl, linolenyl and the like. As is apparent practically any saturated or unsaturated monovalent 1 to 20 carbon atom hydrocarbon radical can be utilized as the radical R, including alkyl radicals, alkadienyl radicals, alkatrienyl radicals, etc. The haloaryl radicals may be any of those which, as has been indicated, are comprised of from 6 to 12 carbon atoms and which have halogen substituents selected from the group of halogens of atomic number from 9 to 35, i.e., fluorine, chlorine and bromine. The term "halo," as employed herein and in the hereto appended claims, is intended to be exclusive of iodine. Any desired degree or extent of halogen substitution may be present in the haloaryl radicals that are employed.

Likewise, equivalent good results are generally obtainable when (X) is either the —CO— or —SO$_2$— radical so that the composite arrangement R(X)— is actually either an acyl or sulfonyl type of group. Examples of composite R(X)— constituents that may be present with especial benefit in the amide compound being decyanoethylated include acetyl groups, CH$_3$CO—; and the like acyl units such as lauroyl groups, stearoyl groups and oleoyl groups; ethoxyacetyl groups, C$_2$H$_4$OCH$_2$CO—; phenyoxyacetyl groups, C$_6$H$_5$OCH$_2$CO—; benzoyl groups C$_6$H$_5$CO—; ortho-chloro-benzyl groups, o-ClC$_6$H$_4$CO—; para-chloro-benzoyl groups, p-ClC$_6$H$_4$CO—; ortho-fluorobenzoyl groups, o-FC$_6$H$_4$CO—; ortho-bromo-benzoyl groups, o-BrC$_6$H$_4$CO—; para-methoxy-ortho-methyl benzoyl groups, p-CH$_3$O-o-CH$_3$—C$_6$H$_3$CO—; 3-chloro-para-toluoyl groups, 3-Cl-p-CH$_3$C$_6$H$_3$CO—; toluoyl groups, CH$_3$C$_6$H$_4$CO—; the various dimethyl benzoyl groups, (CH$_3$)$_2$C$_6$H$_3$CO—; naphthoyl groups, (CH$_3$)$_2$C$_6$H$_3$CO—; naphthoyl groups, C$_{10}$H$_7$CO—; para-nitrobenzoyl groups, p-NO$_2$C$_6$H$_4$CO—; phenyl sulfonyl groups, C$_6$H$_5$SO$_2$—; para - chloro - phenyl sulfonyl groups, p-ClC$_6$H$_4$SO—; and the like.

The strong basic catalyst that is employed for accomplishing the decyanoethylation may advantageously be an alkali metal hydroxide or alkoxide compound. Better results may frequently be experienced with alkali metal alkoxides, such as sodium ethoxide and the like, especially when they contain not more than four carbon atoms in the alkyl portions of their molecules. For most of the reactions, little criticality is involved in the amount of catalyst that is employed so long as it is present in the reaction mass in greater than trace proportions. It may often be desirable, however, to employ at least about 0.5 mole percent of catalyst, based on the quantity in the reaction mass of the N,N-(2-cyanoethyl) amide compound that is being decyanoethylated. When acidic products, such as certain sulfonamides, are being prepared, however, it is usually necessary to employ a sufficient quantity of the catalyst, as an amount that is at least about equimolar with the reactants, in order to prevent its complete destruction during the reaction.

Any suitably non-aqueous solvent may be utilized as the medium in which the decyanoethylation is accomplished. Advantageously, a non-aqueous polar solvent such as low molecular weight aliphatic alcohols, especially ethanol, ethylene glycol, pyridine and the like may be employed. In certain instances, however, non-polar hydrocarbon solvents, such as benzene, may be utilized, especially when an alkoxide catalyst is employed or when the hydrocarbon solvent contains traces of a non-aqueous polar solvent, as benzene containing very slight proportions of ethanol. It is usually advantageous and frequently may be essential for the solvent that is employed to be anhydrous. Not only does this avoid hydrolysis of the nitrile group during the decyanoethylation but it may also prevent degradation of the catalyst. As is apparent, the solvent employed for the decyanoethylation is both capable of dissolving and being non-reactive with the starting N,N-bis-(2-cyanoethyl) amide compound. Generally, the amount or proportion of the solvent that must be employed should suffice to maintain in solution the amine being decyanoethylated during the reaction. Solutions that are at or near saturation may usually be used with benefit.

The desired product N-(2-cyanoethyl) amide compound may be recovered readily by recrystallization techniques after removing the solvent from the reaction mass upon termination of the reaction. The crude product in the reaction mass may ordinarily be obtained in essentially quantitative yields from the N,N-(2-cyanoethyl) amide compound that is being decyanoethylated. After its ultimate recovery by recrystallization or as otherwise desired, the purified product is generally obtainable in yields that are at least as high as 60 percent and frequently considerably greater.

Further illustration of the present method is provided in and by the following examples which are intended to be merely demonstrative and docent in character but are not limiting of the invention.

*Example 1*

About 52.3 grams (0.2 mole) of p-chloro-N,N-bis (2-cyanoethyl)benzamide was heated to a reflux temperature after being dissolved in about 400 milliliters of absolute ethanol. After reaching the boil, a solution of the ethoxide from about 0.2 gram of metallic sodium in about 20 milliliters of absolute ethanol was added to the dissolved amide. Refluxing of the mass under a nitrogen atmosphere was continued for about a three hour period after which the reaction was terminated. The solvent was then evaporated from the reaction mass to leave a residue of crude p-chloro-N-(2-cyanoethyl) benzamide which was obtained in an essentially quantitative yield. The crude product was recrystallized from chlorobenzene to obtain a purified material in the form of white crystals that melted between about 154 and 156° C. The purified product was obtained with about a 62 percent yield in the first crop of crystals.

*Example 2*

The procedure of the first example was repeated excepting to employ an equivalent molar quantity of N,N-bis (2-cyanoethyl) benzamide as the starting material. About the same yield of N-(2-cyanoethyl) benzamide, melting at 94–95° C., was obtained.

*Example 3*

The procedure of the second example was repeated with N,N-bis (2-cyanoethyl) benzamide excepting to substitute a mixture of absolute ethanol and benzene that contained about 97 percent by weight of benzene as the solvent. The results were equivalent to those obtained in the first and second examples.

*Example 4*

The procedure of the second example was repeated with N,N-bis (2-cyanoethyl) benzamide excepting to substitute essentially pure benzene as the solvent. The results were analogous to those obtained in the first and second examples, the difference being a lower yield (about 70 percent) of the crude product in the reaction mass.

*Example 5*

The procedure of the second example was repeated with N,N-bis (2-cyanoethyl) benzamide excepting to substitute a solution of about 1 gram of potassium hydroxide in about 60 milliliters of absolute ethanol as the catalyst. The results were equivalent to those obtained in the first and second examples.

*Example 6*

The procedure of Example 5 was repeated excepting to substitute pyridine as the solvent. Analogous results to those obtained in the first and second examples were realized. The purified product was finally obtained after recrystallization from chlorobenzene in 70 percent yield.

*Example 7*

The procedure of Example 5 was repeated excepting to substitute ethylene glycol as the solvent. The results were similar to those obtained in the first and second examples, the difference being a lower recoverable yield (about 40 percent) of the crude product in the reaction mass.

*Example 8*

The procedure of Example 1 was twice repeated excepting to employ equivalent molar quantities of o-chloro-N,N-bis (2-cyanoethyl) benzamide and p-nitro-N,N-bis (2-cyanoethyl) benzamide as starting materials. Final, purified product yields (after recrystallization) of about 70 percent o-chloro-N-(2-cyanoethyl) benzamide, melting at 80–82.5° C. and 87 percent of p-nitro-N-(2-cyanoethyl) benzamide, melting at 154–155° C. were obtained.

*Example 9*

The general procedure of Example 1 was repeated with an equivalent molar quantity of N,N-bis-(2-cyanoethyl) acetamide as the starting material. About a 61 percent yield of purified N-(2-cyanoethyl) acetamide was obtained after recrystallization of the crude product from the reaction mass with a solvent mixture of chloroform and carbon tetrachloride in a 1:2 weight ratio, respectively. The purified product has a melting point between about 64° C. and 65° C.

*Example 10*

The general procedure of the first example was repeated with an equivalent molar quantity of p-chloro-N,N-bis-(2-cyanoethyl) benzenesulfonamide excepting to use a quantity of the sodium ethoxide catalyst in a greater than equimolar proportion in order to avoid complete destruction of the catalyst by the acidic product p-chloro-N-(2-cyanoethyl) benzenesulfonamide that was formed during the decyanoethylation reaction. The crude product was recrystallized from methyl chloroform to obtain purified crystals melting between 91° C. and 92.5° C. with an ultimate yield of about 65 percent.

Analogous results may be obtained when other N,N-bis-(2-cyanoethyl) amide compounds are decyanoethylated in accordance with the present invention including those wherein the composite R(X)— arrangement is any of those specifically mentioned or generically inferred herein.

What is claimed is:

1. Method for the preparation of an N-(2-cyanoethyl) amide compound that has the general formula:

R—(X)—NHCH$_2$CH$_2$CN wherein R is selected from the group consisting of saturated and unsaturated monovalent hydrocarbon radicals containing from 1 to about 20 carbon atoms; alkoxyalkyl radicals containing from about 1 to 20 carbon atoms in each of the alkyl units of the radical in which said alkyl units are hydrocarbon; aryloxyalkyl radicals containing from 6 to 12 carbon atoms in the aryl unit of the radical and from 1 to about 20 carbon atoms in the alkyl unit of the radical in which said aryl and said alkyl units are hydrocarbon; hydrocarbon aryl radicals containing from 6 to 12 carbon atoms; alkoxyaryl radicals containing from 1 to about 20 carbon atoms in the alkyl unit of the radical and from 6 to 12 carbon atoms in the aryl unit of the radical in which said alkyl and said aryl units are hydrocarbon; haloaryl radicals containing halogen substituents of atomic number from 9 to 35 and from 6 to 12 carbon atoms in which the aryl unit of said radical is hydrocarbon; and nitroaryl radicals containing from 6 to 12 carbon atoms in which the aryl unit of said radical is hydrocarbon; and (X) is selected from the group consisting of the bivalent radicals —CO— and —SO$_2$—, said method comprising dissolving in a non-aqueous solvent an N,N-bis-(2-cyanoethyl) amide compound of the general formula:

$$R-(X)-N(CH_2CH_2CN)_2$$

(wherein both R and (X) have the same meanings as in the N-(2-cyanoethyl) amide product compound), said solvent being capable of dissolving and non-reactive with said N,N-bis-(2-cyanoethyl) amide compound; incorporating a strong basic catalyst in said solvent selected from the group consisting of alkali metal hydroxides and alkali metal alkoxides that contain no more than four carbon atoms in said alkoxide group; then heating said solution of the N,N-bis-(2-cyanoethyl) amide compound to a reflux temperature; and decyanoethylating said dissolved N,N-bis-(2-cyanoethyl) amide compound under said refluxing conditions.

2. The method of claim 1, wherein the decyanoethylation is accomplished under atmospheric pressure and at the boil.

3. The method of claim 1, wherein the strong basic catalyst is an alkali metal hydroxide.

4. The method of claim 1, wherein the strong basic catalyst is an alkali metal alkoxide that does not contain more than 4 carbon atoms.

5. The method of claim 1, wherein the strong basic catalyst is sodium ethoxide.

6. The method of claim 1, wherein the solvent is a polar solvent.

7. The method of claim 1, wherein the solvent is an alcohol.

8. The method of claim 1, wherein the solvent is ethanol.

9. The method of claim 1, conducted under anhydrous conditions.

10. The method of claim 1, wherein the composite R(X)— constituent in the N-(2-cyanoethyl) amide compound is an acetyl group.

11. The method of claim 1, wherein the composite R(X)— constituent in the N-(2-cyanoethyl) amide compound is a benzoyl group.

12. The method of claim 1, wherein the composite R(X)— constituent in the N-(2-cyanoethyl) amide compound is a chlorobenzoyl group.

13. The method of claim 1, wherein the composite R(X)— constituent in the N-(2-cyanoethyl) amide compound is a nitrobenzoyl group.

14. The method of claim 1, wherein the composite R(X)— constituent in the N-(2-cyanoethyl) amide compound is a phenylsulfonyl group.

References Cited in the file of this patent

UNITED STATES PATENTS

| | | |
|---|---|---|
| 2,798,059 | Guth et al. | July 2, 1957 |
| 2,885,435 | Pursglove | May 5, 1959 |